Sept. 3, 1968     D. B. LANDERS ET AL     3,399,605
DUAL JOINT

Filed Feb. 9, 1966     3 Sheets-Sheet 1

INVENTORS
DON B. LANDERS
MURL R. RICHARDSON

BY *Alexander & Dowell*
ATTORNEYS

Sept. 3, 1968 D. B. LANDERS ET AL 3,399,605
DUAL JOINT

Filed Feb. 9, 1966 3 Sheets-Sheet 3

INVENTORS
DON B. LANDERS
MURL R. RICHARDSON

BY Alexander & Dowell

ATTORNEYS

United States Patent Office 3,399,605
Patented Sept. 3, 1968

3,399,605
DUAL JOINT
Don B. Landers, Houston, and Murl R. Richardson, Fort Worth, Tex., assignors to Oil States Rubber Co., a corporation of Texas
Filed Feb. 9, 1966, Ser. No. 526,289
8 Claims. (Cl. 92—180)

ABSTRACT OF THE DISCLOSURE

A joint for detachably joining together two rod sections so that when they are under tension the joint becomes a swivel joint, and when they are under compression they lock together for unitary rotational motion. The joint includes a cylindrical female member having two C-shaped axially spaced transverse seats opening in opposite radial directions, and a male member having two axially spaced enlargements for resting on those seats. The female member has a transverse bore between the seats through which the male member is inserted transversely and then tilted into axial alignment with the female member. The latter has a notched skirt portion adapted to engage the spline-like fluted adjacent end of the male member to lock them against mutual rotation when the joint is in compression.

---

This invention relates to improvements in rod joints and more particular to novel joint structures especially well adapted for use on swab mandrels in oil wells.

As is well-known in the prior art, for instance in Grandstaff Patent 3,066,614, it is desirable to provide detachable articulating joints between sections of swab mandrels so that they can follow curves in tubes being swabbed and so that any desired number of swabs can be assembled in tandem mutual relationship.

It is a major object of this invention to provide improved-strength joints of the type which can be quickly and easily coupled or decoupled without the use of tools, these joints resembling somewhat the basic type of engagement illustrated in Gillespie Patent 2,436,994.

It is another important object of this invention to provide extra-strength joints which are capable of mutually swiveling around their longitudinal axes when joining together mandrel sections which are suspended one below another in approximate mutual alignment.

Still another object of the invention is to provide joints in swab assemblies wherein mutual swiveling of the mandrel sections is permitted when the joints are under tension, but wherein the mandrel sections are locked against mutual rotation whenever the joints are under compression sufficient to telescope them further together, so that when a swab fails to drop within a tubing string, the mandrels can be rotated to help clear the encountered obstruction.

It is a more specific object of this invention to provide a dual bearing-area joint of novel design in which there are two bearing-surface engagements located in spaced relationship with respect to the axes of the associated mandrel sections, this dual structure approximately doubling the bearing area as compared with prior-art mandrel joints. These dual bearing areas preferably occupy flat planes oriented transversely of the mandrel axes so that longitudinal forces supported by the mandrel sections and tending to pull them apart do not generate transverse forces tending to spread the C-shaped female seat portions of the joint, as is the case for instance where the bearing engagements are spherical in shape. It is to be noted, however, that the present dual joints can be successfully made and operated with bearing areas which are spherical, or otherwise shaped.

Another improvement resides in the fact that the dual-joint seats have side slots opening radially in opposite directions so that lateral stresses between the male and female joint portions are always opposed by at least one of the dual-seat portions at a zone which is remote from the side-wall slot thereof and therefore is not weakened thereby.

Other objects and advantages of the present invention will become apparent during the following discussion of the drawings, wherein:

FIG. 6 is an enlarged detail view of the lowermost mandrel section; and

Figure 1:
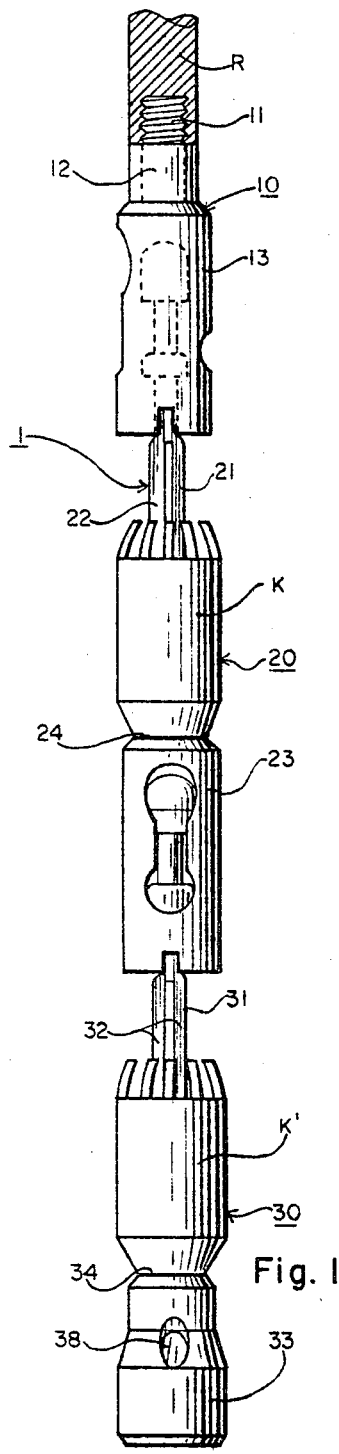
FIG. 1 is an elevation view of a three-section swab and mandrel assembly having two axially-spaced dual-joints according to the present invention.

Referring now to the drawings, FIG. 1 shows a complete swab and mandrel assembly 1 which includes at least three different mandrel sections as follows: An uppermost mandrel section 10, FIG. 2; one or more intermediate mandrel sections 20, FIG. 4; and a lowermost mandrel section 30, FIG. 6. All of these mandrel sections are mutually joined together by dual joints which comprise the structure of the present invention, and which can be best seen in FIGS. 5 and 7.

Figure 2:
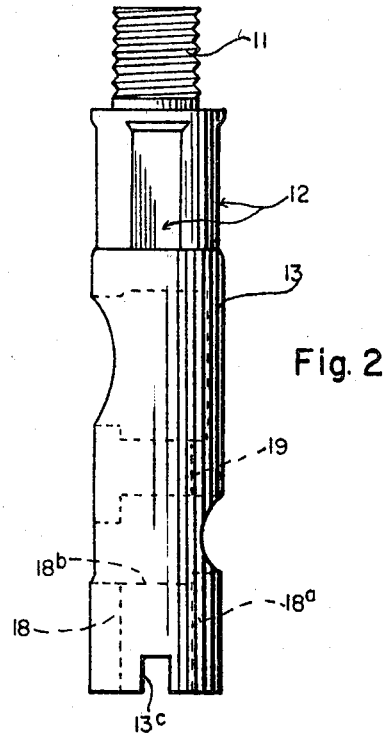
FIG. 2 is an enlarged detail view of the uppermost mandrel section.

The uppermost mandrel section 10, FIG. 2, comprises an adapter having a threaded upper end 11 intended to be screwed into a supporting rod string R, and having a series of wrench flats 12 to assist in making and breaking the connection at the threads 11.

Figure 3:
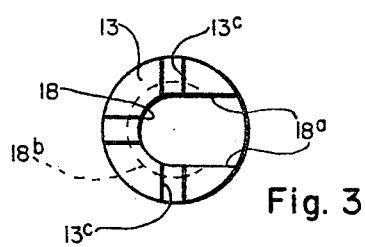
FIG. 3 is an end view of FIG. 2.
Figure 5:
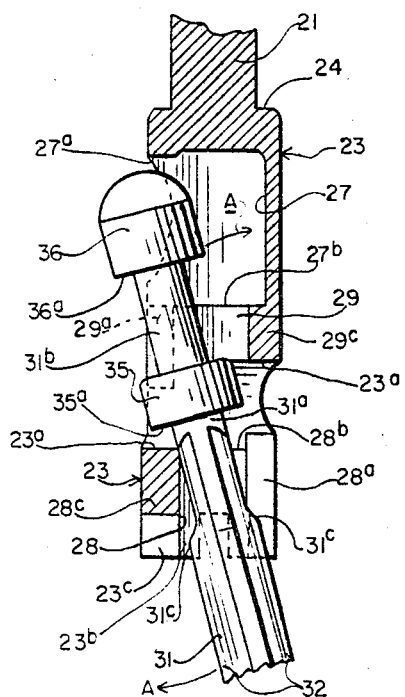
FIG. 5 is a detail view of a dual joint according to the invention, shown partly in section and with the male portion of the joint in the process of being inserted through the female portion during assembly of the joint.

One portion of the first dual joint is located just below the opposed wrench flats 12 and comprises an enlarged cylindrical body 13 which is shaped as shown in FIGS. 2, 3, and 5. This portion of the dual joint is the female portion, and engages a male portion at the upper end of the next depending mandrel section 20. The joint structure itself will be described in greater detail hereinafter.

Figure 4:
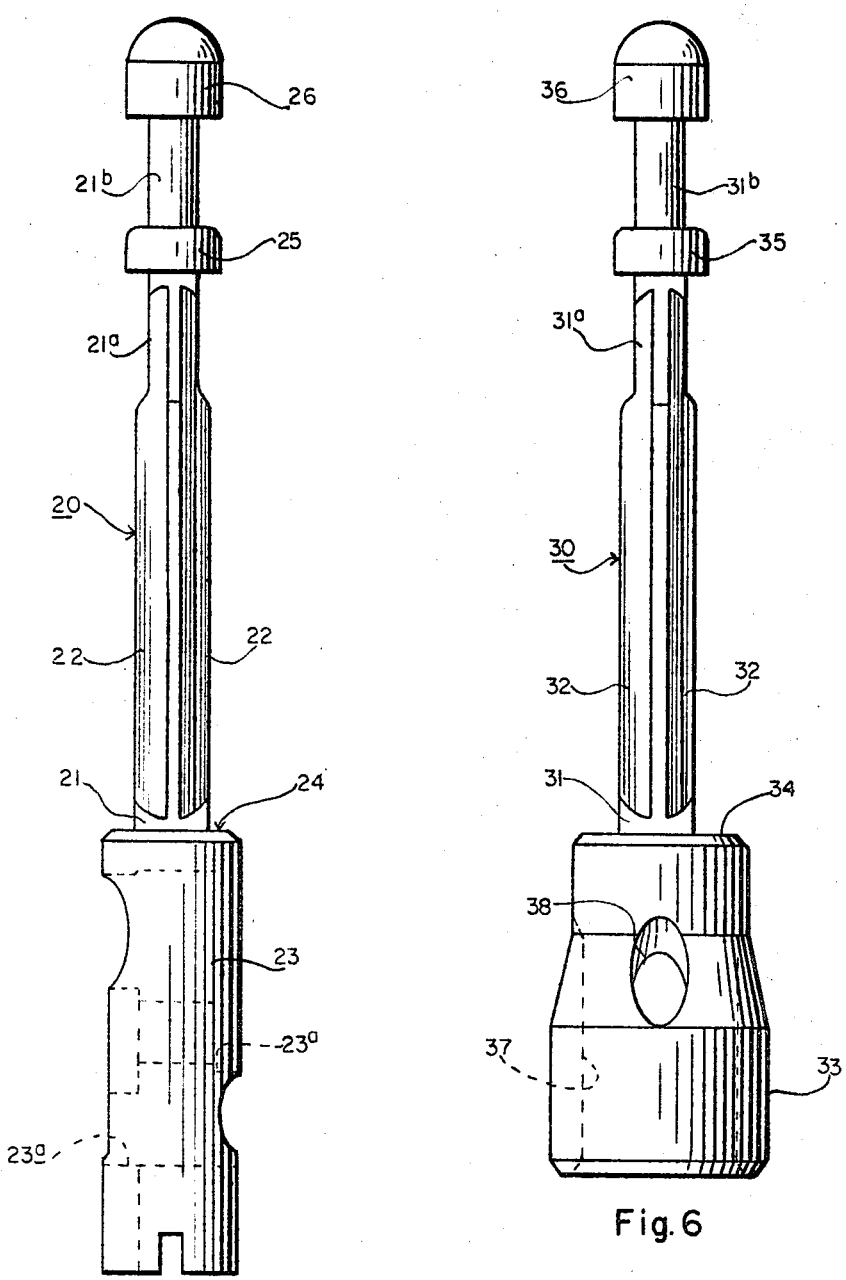
FIG. 4 is an enlarged detail view of an intermediate mandrel section.

The present illustrative embodiment shows an intermediate mandrel section 20, FIG. 4, including an elongated rod portion 21 which is fluted as at 22 to provide a mandrel valving action in cooperation with a rubber swab cup K in a manner which is so well-known in the prior art as to require little discussion. The swab cup K, FIG. 1, rests upon the upper shoulder 24 of a cylindrical body joint portion 23 which is structurally identical to the female body portion 13 of the upper mandrel section 10. When the mandrel rises so that the swab cup K abuts the shoulder 24, the valving action is in closed condition; but when the mandrel drops and the cup slides up into the zone opposite the flutes 22, the valving action is in open condition and permits the flowing of fluids through the flutes and through the central bore of the cup to by-pass the latter. With respect to the fluted rod portion, the cup K, and the seating thereof against the shoulder 24, the present disclosere is the same as the prior art, shown for instance in the Grandstaff Patent 3,066,614 and in many other prior patents.

The upper end of the rod portion 21 is reduced in diameter as at 21a and 21b so as to leave two enlargements 25 and 26 which form the male part of the dual joint as will be described presently. The outer diameter of the enlargements 25 and 26 is no greater than the smallest inside diameter of the swab cup K so that the latter can be inserted over the upper end of the intermediated mandrel section 20 in order to install the cups on the fluted rod portion 21–22.

The lowermost mandrel section 30 includes a rod portion 31 which is fluted as at 32, and which is reduced in diameter as at 31a and 31b in order to leave enlargements 35 and 36. The rod 31 is intended to support a swab cup K' as shown in FIG. 1 and this swab cup rests upon a shoulder 34 which provides valving action which is the same as that provided by the elements 21, 22, and 24 with respect to the swab cup K. The lowermost mandrel section 30 is intended to terminate the swabbing string, and is provided with a cylindrical lower end 33 whose outer diameter is somewhat less than the tubing to be swabbed. This terminating lower end has a bore 37 which is by-passed by a duct 38 so as to by-pass well fluids and entrained paraffin or other solid matter scraped from the tubing by the cylindrical portion 33 as the swab assembly is lowered into the tubing. The structure of this lower end 33 is similar to structures currently being manufactured and sold upon a commercial scale, and used for this same purpose.

The present embodiment includes two novel joints located between the three sections of the assembly illustrated in FIG. 1, and these two dual joints are identical. Therefore, only the lower one of them will be described herein.

Dual joint

Figure 7:
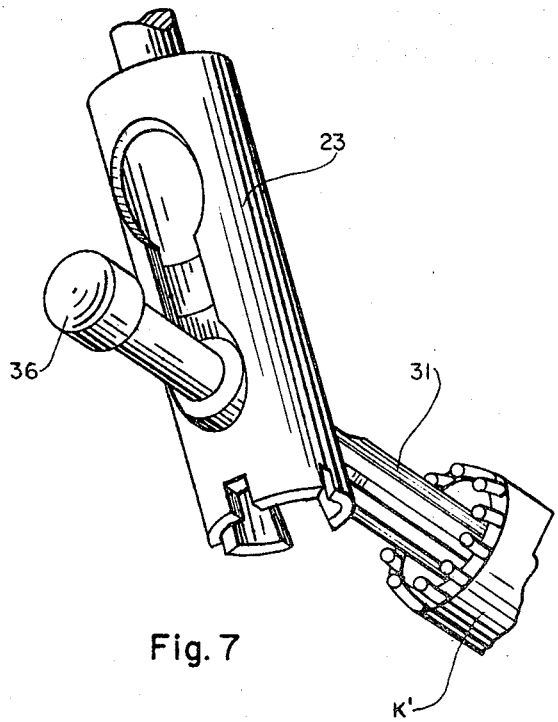
FIG. 7 is a perspective view similar to the view in FIG. 5 and rotated about the vertical through about 45°.

The following description is provided which is typical of both dual joints in the present disclosure. As shown in FIGS. 5 and 7 each joint includes a cylindrical female body portion 23 and a male portion 31a–35–31b–36.

About two-thirds of the way down on the cylindrical body 23 this is a bore 23a which extends all the way through the cylindrical portion 23 in a substantially diametrical direction, and this bore is large enough to pass the enlargements 35 and 36 of the male portion of the joint when inserted therethrough as shown in FIG. 7. The body 23 includes an upper cavity 27 and a lower cavity 28 which have side-wall slots 27a and 28a opening in mutually opposite directions so that after the male portion has been entered through the bore 23a it can be rotated to bring the rods 21 and 31 into mutual elignment by turning the rod in the direction of the arrows A, FIG. 5. When this rotation is accomplished, the enlargement 36 enters the cavity 27 and the enlargement 35 remains within the bore 23a, and the rod portion 31a passes downwardly through the central opening of the cavity 28. The rod portion 31b passes through the central opening of the cavity 29. When the rods 31 and 21 are axially aligned after tilting the rod 31 in the direction of the arrows A, the male portion is lowered with respect to the female body portion until the bearing surface 36a rests upon the seat 27b at the bottom of the upper chamber 27 and the bearing surface 35a rests upon the seat 28b at the upper end of the chamber 28 and the opposed bearing sufaces are free to swivel upon each other. The seats 27b and 28b are essentially annular, but have sidewall slot openings extending in opposite diametric directions so as to respectively pass the rod portions 31b and 31a. Referring to FIG. 3, corresponding portions of the upper joint can be seen, including side slot 18a and the seat 18b located above the chamber 18, which parts correspond respectively with the parts 28, 28a, and 28b in FIG. 5.

The lower end of the cylindrical portion 23, FIG. 5, terminates in an annular skirt 23b, and this skirt has notches 23c which are located at 90° intervals around the bottom of the skirt, and are able to engage the upper ends of the ribs between the flutes, which ribs form projections as at 31c in FIG. 5. The interlocking of the projections 31c with the notches 23c is useful because it permits locking of the swivel joints in case the lowermost member 33 hangs up inside of the tubing when the swab assembly is being lowered. In other words, if the lower end of the swab assembly meets an obstruction, the male portions will rise into the female portions of the joints and permits the projections 31c to engage within the notches 23c, thereby locking the male joint sections for rotation with the engaged female sections so that the entire swab assembly can be further manipulated by rotation of the entire swab assembly in unison. This expedient permits the joints to be swivel joints when they are under tension, but locked against mutual rotation when they are telescoped together under compression as a result of bottoming of the lowermost section.

The axial openings 28 and 29 which extend through the female body portion 23 are enough larger in diameter than the diameter of the rod portions 31a and 31b of the male joint portion to provide a loose fit wherein the male portion can shift or tilt through reasonable misalignment angles with respect to the female section in order to allow adequate articulation between adjacent mandrel assembly sections 10, 20, and 30 so that the swab assembly can follow curves in the tubing being swabbed. Notwithstanding this looseness, the present joint is very secure against accidental disengagement because of the fact that the male section has to be tilted about 45° out of alignment with the female section before it can be removed therefrom.

In the event that the male and female sections are shifted transversely with respect to each other in opposite directions, there are always one or two walls of the central openings 28 and 29 which prevent disengagement, because of the fact that the side-wall slots 28a and 29a open in diametrically opposite directions. The metal below the seats and around the central openings 28 and 29 is rather thick, as at 28c and 29c, and this fact provides adequate strength to prevent spreading of the female portions in the vicinity of the bearing seats 27b and 28b, especially in view of the dual bearing areas and the fact that the sidewall slots are out of mutual alignment.

The present invention is not to be limited to the exact illustrative embodiments shown in the drawings for obviously changes can be made within the scope of the following claims.

What is claimed is:

1. A joint for detachably joining together two rod sections in approximate axial alignment, comprising:
   (a) a male joint portion carried by one rod section and including two enlargements spaced by an axial distance and located near its end; and
   (b) a female joint portion carried by the other rod section and comprising a body having cylindrical side walls surrounding an axial bore containing two bearing seats spaced by the same axial distance and facing away from said one rod section, the bore adjacent to the seats being sized to pass said one rod section but not its enlargements, said cylindrical side walls having side openings sized to pass said enlargements and extending through the two bearing seats in diametrically opposite radial directions, and said side walls having a transverse bore extending therethrough between the seats and communicating with both of said opposite side openings for passing said male joint portion part-way through said female portion when their two axes are crossed to permit entry of said enlargements through said side openings and onto said seats when the axes of said portions are tilted into alignment.

2. In a joint as set forth in claim 1, the enlargements of the male portion having annular bearing surfaces, and the bearing seats as viewed transversely of the axis of the female portion being C-shaped and opening in radially opposite directions.

3. In a joint as set forth in claim 1, said one rod section having a fluted mandrel rod ending just short of the enlargements, and the female portion comprising a hollow body containing said seats and having a skirted end terminating just short of the fluted portion of the mandrel rod when the joint is under tension, and the skirted end having notches disposed to mate with said fluted mandrel rod when the joint is under compression.

4. In a joint as set forth in claim 1, said seats and said enlargements having substantially annular mutually engaging bearing surfaces, and said surfaces occupying flat planes disposed normal to the axes of the mandrel sections supporting them.

5. A swab assembly, comprising:
 (a) multiple elongated mandrel sections;
 (b) swap cup means on at least one of said mandrel sections; and
 (c) articulating joints between sections, each joint comprising a female joint portion carried by one section and having a hollow body including seat means therein facing away from the adjacent mandrel section, a male joint portion carried by said adjacent section and having enlargement means rotatably engaging said seat means when the joint is under tension, and opposed projections carried by both portions in mutually spaced relationship when the joint is under tension, but mutually engaging when the joint is under compression to lock the joint against relative rotation of its engaged portions.

6. In a swab assembly as set forth in claim 5, the male portion of the joint being located at the end of a section having a fluted mandrel rod, and said hollow body having a skirted end terminating just short of the fluted portion of the rod when the joint is under tension, and said projections comprising the fluted portion of the rod, and complementary notches in the skirted end of the body positioned to mate with said fluted portion when the joint is under compression.

7. In a swab assembly as set forth in claim 5, each female portion having two axially spaced seat means, and each male portion having two axially spaced enlargement means, and the female portion having opposed side openings therethrough to admit the male portion and permit the two enlargement means to be placed upon the corresponding seat means when the axes of the mandrel sections are in mutual alignment.

8. In a swab assembly as set forth in claim 5, said seat means and said enlargement means being substantially annular and having mutually engaging bearing surfaces, and said surfaces being planar and occupying flat planes disposed normal to the axes of the mandrel section supporting them.

References Cited
UNITED STATES PATENTS

| | | | |
|---|---|---|---|
| 1,250,509 | 12/1917 | Rigby | 287—103 |
| 2,444,919 | 7/1948 | Cotton et al. | 287—104 X |
| 2,603,325 | 7/1952 | Pickard | 192—67 |
| 2,624,549 | 1/1953 | Wallace | 255—28 |
| 2,998,990 | 9/1961 | Plattsmier et al. | 287—103 |
| 3,002,466 | 10/1961 | Read | 103—225 |
| 3,157,258 | 11/1964 | Cronholm | 192—67 X |
| 3,275,354 | 9/1966 | Sutliff et al. | 287—103 |

MARTIN P. SCHWADRON, *Primary Examiner.*

G. N. BAUM, *Assistant Examiner.*